United States Patent [19]

Asai

[11] Patent Number: 5,460,763
[45] Date of Patent: Oct. 24, 1995

[54] SPRUELESS DISC MOLD AND DISC MOLDING METHOD THEREOF

[75] Inventor: Ikuo Asai, Ohbu, Japan

[73] Assignee: Kabushiki Kaisha Meiki Seisakusho, Aichi, Japan

[21] Appl. No.: 360,057

[22] Filed: Dec. 20, 1994

[30] Foreign Application Priority Data

Dec. 24, 1993 [JP] Japan .................... 5-348159
Nov. 14, 1994 [JP] Japan .................... 6-304263

[51] Int. Cl.$^6$ .................................... B29C 45/38
[52] U.S. Cl. ............... 264/107; 264/328.9; 264/328.15; 425/549; 425/564; 425/810
[58] Field of Search ................... 264/107, 1.33, 264/161, 328.1, 328.7, 328.9, 328.15; 425/549, 548, 564, 810

[56] References Cited

U.S. PATENT DOCUMENTS

| 4,340,353 | 7/1982 | Mayer | 425/810 |
| 4,391,579 | 7/1983 | Morrison | 425/810 |
| 4,394,117 | 7/1983 | Taylor . | |
| 4,405,540 | 9/1983 | Mayer . | |
| 4,412,805 | 11/1983 | Morriison | 425/810 |
| 4,439,132 | 3/1984 | Morrison | 425/810 |
| 4,472,124 | 9/1984 | Kashihara et al. | 425/810 |

FOREIGN PATENT DOCUMENTS

| 60-23971 | 6/1985 | Japan . |
| 60-23972 | 6/1985 | Japan . |
| 63-13808 | 3/1988 | Japan . |
| 5-212757 | 8/1993 | Japan . |

*Primary Examiner*—Jill L. Heitbrink
*Attorney, Agent, or Firm*—Oliff & Berridge

[57] ABSTRACT

A sprueless disc mold including: a gate insert; a hot plunger adapted to come into sliding contact with the gate insert and heated and held; drive means for moving the hot plunger to open/close the gate; and a cooling air passage. The hot plunger includes a shoulder portion formed at its leading end portion. The gate insert includes: a leading end face forming a portion of a cavity face together with the shoulder portion of the hot plunger; an annular recess for forming the disc into a shape having one face raised to the crest of a stack rib; and an inner circumference extending from the inner circumferential edge of the circumferential recess toward the gate. The hot plunger further includes at its leading end portion: an outer circumference forming the inner circumference near the gate and adapted to come into sliding contact with the inner circumference of the gate insert to close the gate; a chamfered portion formed on the corner, at which the outer circumference and the shoulder portion come into contact with each other, and having an inner slope leading from the crest of the stack rib to the face of the disc. At the protruded position of the hot plunger, the annular recess of the gate insert and the chamfered portion of the hot plunger are made to come into contact with each other to form a recess for forming the stack rib.

12 Claims, 12 Drawing Sheets

| | MOLD CLOSING | PRESSURE INCREASING | INJECTING/ CHARGING | INJECTION HOLDING | HOT PLUNGER COMPRESSING | COOLING | MOLD OPENING | EJECTOR PROTRUDING | EJECTOR RETRACTING | |
|---|---|---|---|---|---|---|---|---|---|---|
| 1ST HYDRAULIC CYLINDER | − | + | + | + | − | − | − | − | − | +: RIGHT DISPLACEMENT HOT PLUNGER COMPRESSION IS INITIATED DUE TO THE TIME-SETTING DURING INJECTION HOLDING |
| 2ND HYDRAULIC CYLINDER | − | + | + | + | − | − | − | − | − | +: RIGHT DISPLACEMENT |
| EJECTOR PIN | −/+ | + | + | + | − | − | − | + | − | +: RIGHT DISPLACEMENT |
| COOLING AIR | − | − | −/+ | + | + | + | − | − | − | +: ON |

SPRUELESS DISC MOLD AND DISC MOLDING METHOD THEREOF

BACKGROUND OF THE INVENTION

1. Field of the Invention

The present invention relates to a sprueless disc mold and a disc molding method for injection-molding a recording medium disc substrate such as a video disc or a compact disc (as abbreviated to CD) having an opening at its center.

2. Related Art

Generally speaking, the disc substrate is manufactured by an injection-molding process using a disc mold. As shown in FIG. 11, this molding process is performed by charging a cavity 56, which is formed between a mirror plate 50 of a stationary molding member and a stamper 54 mounted on a mirror plate 52 of a movable molding member, with a molten resin injected from the (not-shown) nozzle of an injector through a sprue hole 58.

The stamper 54 is used to transfer the helical or concentric pits, which are formed with surface corrugations having a width of about 0.5 microns, as recording information data to the disc. This stamper 54 is fixed by having its inner circumferential edge and outer circumferential edge held on the mirror plate 52 of the movable molding member by the flanged portion 60a of a stamper holder 60.

After the molten resin charged in the mold has been solidified to a predetermined hardness, the disc substrate has its center opening 66 (as shown in FIG. 12) punched out by a center punch 64 which is enabled to slide therein by using a sleeve 62 as a guide member.

Here will be described a disc substrate 1 to be molded by the mold described above.

The disc substrate 1 has its shape schematically shown in a top plan view and in a section in FIGS. 12 and 13. This disc is formed with at its center with the opening and around this opening 66 with an annular groove 68 to be formed as a recess by the flanged portion of the stamper holder, and is divided across the annular groove 68 into a clamp area 70 at the inner side and a signal area 72 at the outer side. To this signal area 72, there are transferred by the stamper 54 the pits which are formed in the helical or concentric shape.

Moreover, the disc substrate 1 is thus molded by an injection-molding apparatus and is then stacked on a stacker. In order that, in this case, the disc substrate may be prevented from contacting with and being damaged by another while promoting the heat dissipation from the substrates, each of these substrates is formed with an annular stack rib 80 on its back providing the recording information face. This stack rib 80 is formed either in a radially outward or inward offset from the annular groove 68 arranged to face it on the surface or in the same position but with a larger width than that of the annular groove 68.

In this molding process of the disc substrate, the step of punching out the center opening is included to elongate the time period for the molding cycle, and powdery chip is produced by cutting the disc internal diameter through the punching step so that it is caught by the electrified disc substrate or by the stamper in the mold. As a result, there arises a problem that the chip is mixed into the disc substrate at a next shot, to deteriorate the production yield of the molding.

Thus, there is raised by the makers a movement that the molding cycle is to be shortened by omitting the step of punching out the center opening, which has been required in the prior art. The sprueless mold is noted as the disc mold for satisfying the movement. By adopting the sprueless mold using a hot runner, according to the recent trial, the disc substrate is manufactured not only by solving the defect of the prior art but also by eliminating the sprue and the runner for the passages of the molten resin to minimize the loss of the material.

The mold of this kind is disclosed in U.S. Pat. No. 4,394,117, 4,391,579, 4,340,353 or 4,405,540 or Japanese Patent Laid-Open No. 212757/1993, for example.

The mold, as disclosed in U.S. Pat. No. 4,394,117 (corresponding to Japanese Patent Publication No. 23972/1985) to be exemplified herein, is used to manufacture a recording disc having a center opening by using an injection-molding apparatus and is equipped with a valve assembly for controlling the flow of a molten resin to be charged in the mold cavity.

This valve assembly is exemplified by a sprue bush 100 having a hot runner structure, as shown in FIG. 14. This sprue bush 100 is constructed of: a stem 106 having a heating coil 102 mounted around a resin passage 103 and a conical dispersion head 104 mounted on its lower portion; and a sleeve valve 108 fitted slidably on the stem 106. The sleeve valve 108 is so urged to a protruded position, i.e., a closed position by spring means 114 such as a dish spring as to bring a conical face 110 of the dispersion head 104 and an annular slope 112 on the lower edge of the sleeve valve 108 into abutment against each other, but normally prevents the molten material from flowing into a cavity 116.

When the molten material is injected under pressure through the sprue bush 100, it axially flows to the dispersion head 104 and passes through a plurality of radially extending grooves until it reaches the gate reservoir. If the pressure in the sprue bush exceeds a predetermined level, the sleeve valve 108 rises in the direction of arrow A in response to that pressure until it is automatically retracted to an open position. As a result, the gate is opened by establishing a gap between the slope 112 on the lower edge of the sleeve valve and the conical face 110 of the dispersion head, to charge the cavity with the molten material.

After this, if the pressure to be applied to the molten material is lowered to a level lower than the valve retracting pressure, the force to be applied to the sleeve valve 108 by the spring 114 overcomes the force acting upon the pressure face of the valve, to push the sleeve valve 108 back to the closed position.

Since, in this case, the material in the vicinity of the sleeve valve is pushed back to the bore of the sprue bush by the inner slope at the leading end of the valve, the material in the cavity can be prevented from being locally disturbed, and the pressure fluctuation of the molten material in the sprue bush can also be prevented from being transmitted to the inside of the cavity by closing the sleeve valve.

The sleeve valve 108 thus constructed has an external diameter corresponding to the internal diameter of the center opening for forming the information disc, and the disc is molded with the center opening on the basis of the contour of the valve as a result that the valve moves to the closed position before the molten material solidifies. This makes it unnecessary to punch out that opening.

In the valve assembly of this type, however, the disc opening is formed such that the molten resin is separated by the leading end portion of the sleeve valve, so that the shape of the opening portion and the finish of the surface when the resin solidifies are not always satisfactory without neither any step nor any bur. Since, moreover, the structure is made such that the resin retains its passage opening by its own flow, it is limited by the fact that the control for starting the separation of the center opening before the end of injection cannot be achieved.

On the other hand, the disclosure of U.S. Pat. No. 4,340,353 (corresponding to Japanese Patent Publication No. 23971/1985) seems to have any substantial difference from the center opening forming concept of the prior art in that the valve is moved to separate the center opening.

In addition, another sprueless mold for the disc having the hot sprue bush is disclosed in U.S. Pat. No. 4,439,132 (corresponding to Japanese Patent Publication No. 13808/1988) or 4,412,805, for example.

The mold of this kind is equipped, as shown in FIG. 15, with a sprue bush 122 for forming an annular gate 120 in a slightly recess plane on the disc face, as spaced from the center opening of the disc. This sprue bush 122 is given a hot runner structure in which a conical dispersion head 130 is fixedly arranged in abutment against the bottom of a step 128 having a heat cartridge 124 therein and a heating coil 126 arranged around its upper portion. A resin passage 134 is formed in a conical face 132 between the stem 128 and the dispersion head 130.

In this hot runner, as shown in FIG. 16, the dispersion head 130 is formed with a plurality of spacer steps 136, which are circumferentially arranged to inject the molten resin radially outward, so that the molten resin flowing from the center hole 138 of the stem is divided into homogeneous annular flows to pass between the conical faces to the cavity. Moreover, the resin material thus annularly dispersed through those spacer steps 136 is accelerated while flowing toward the cavity so that it does not solidify with an excellent flow to the gate.

In this case, however, the sprue bush 122 and the dispersion head 130 are fixed to each other so that the gate is always opened. As a result, the gate mark is left on the face of the molded disc. If this gate mark rises from the disc face, a post-treatment for removing it may become necessary.

SUMMARY OF THE INVENTION

In view of this background, the present invention has an object to provide a sprueless disc mold and a molding method thereof, which is freed from any gate mark to be formed at the time of molding a disc and which is accurately molded with a center opening.

Another object of the present invention is to mold the disc in high productivity without any NG molding by improving the smoothness of the disc surface and the double refractive index of the periphery of the opening.

In order to achieve the above-specified objects, according to a first aspect of the present invention, there is provided a sprueless disc mold comprising: a stationary molding member and a movable molding member; mirror plates arranged to face each other between the stationary molding member and the movable molding member thereby to form a cavity for molding a disc; a stamper arranged on at least one of the mirror plates for transferring recording information to the disc; a gate insert arranged in a hollow portion between a gate leading to the cavity and an inlet port of a molten resin; a hot plunger adapted to come into sliding contact with the gate insert and heated and held; drive means for moving back and forth the hot plunger to open/close the gate; an ejector mechanism for protruding the molded disc; and a cooling air passage for cooling down the leading end of the hot plunger, wherein the hot plunger includes a shoulder portion formed at its leading end portion, wherein the gate insert includes: a leading end face forming a portion of a cavity face together with the shoulder portion of the hot plunger; an annular recess for forming the disc into a shape having one face raised to the crest of a stack rib; and an inner circumference extending from the inner circumferential edge of the circumferential recess toward the gate, wherein the hot plunger further includes at its leading end portion: an outer circumference forming the inner circumference near the gate and adapted to come into sliding contact with the inner circumference of the gate insert to close the gate; a chamfered portion formed on the corner, at which the outer circumference and the shoulder portion come into contact with each other, and having an inner slope leading from the crest of the stack rib to the face of the disc, and wherein at the protruded position of the hot plunger the annular recess of the gate insert and the chamfered portion of the hot plunger are made to come into contact with each other to form a recess for forming the stack rib.

The present invention is further characterized by a cooling air passage for cooling down the leading end portion of the hot plunger. As a result, during the injecting/charging operations, the molten resin in the cavity can be soon cooled down to promote the molding cycle.

According to a second aspect of the present invention, an ejector mechanism includes an ejector sleeve adapted to be fitted in the outer circumference of the central engagement portion of the hot plunger and to come into abutment against the shoulder portion when the mold is to be closed.

According to a third aspect of the present invention, the drive means includes: a first hydraulic cylinder fixed in the stationary molding member for moving back and forth a core plate coupled to the hot plunger; and a second hydraulic cylinder for driving a stopper plate into and out of one side portion of the core plate.

As a result, the first hydraulic cylinder can be fixed by inserting the stopper plate into the core plate to fix the position of the hot plunger which might otherwise be fluctuated by the injection pressure.

According to another aspect of the present invention, there is provided a method for molding a disc by using the sprueless disc mold according to the first aspect of the present invention, which method comprises the steps of: retracting, after the operation of closing the mold, the hot plunger from a first hydraulic cylinder to open the gate thereby to inject and charge the cavity with the molten resin, and then applying a proper holding pressure; protruding the hot plunger, before the molten resin solidifies, to bring the outer circumference of its leading end portion into sliding contact with the inner circumference of the gate insert to close the gate; further protruding the hot plunger while compressing the molten resin with the shoulder portion of the leading end portion of the hot plunger pushing the cavity face, to bring the shoulder portion to a position in which a clamp area face matching a predetermined thickness of the disc is formed; and forming, at the end of the compressing operation of the hot plunger, the center opening of the disc around the central engagement portion at the leading end portion of the hot plunger and bringing the annular recess formed in the inner circumferential edge of the gate insert and the chamfered portion formed on the corner of the shoulder portion at the leading end portion of the hot plunger, into contact with each other to form the cavity face with an annular recess for forming a stack rib.

According to the construction described above, when the gate is closed, the annular recess in the leading end portion of the gate insert and the chamfered portion on the leading end portion of the hot plunger are brought into contact with each other to form the annular recess so that the shape of the stack rib of the disc can be formed to eliminate the gate mark completely.

Since, moreover, the cooling air is fed to the cooling air passage at the leading end portion of the hot plunger, the molten resin in the cavity is cooled down either simultaneously with the mold cooling step in the molding cycle or soon before the end of the charging operation so that its solidification can be promoted.

Still moreover, the center hole of the disc is determined by the external diameter of the central engagement portion at the leading end portion of the hot plunger so that it is formed by not the punching step but by the molding step during the molding cycle. The hot plunger is in sliding contact with gate insert and has its leading end portion fitted at its central engagement portion in the ejector mechanism so that it can be always centered.

Since, furthermore, the gate port is formed in the corner of the stack rib, the hot plunger can have its external diameter enlarged to have the heating means therein thereby to optimize the heated state of the molten resin.

In case the molding process is to be accomplished by using the disc mold of the present invention, the compressing action of the hot plunger to protrude the same in the direction to decrease its capacity is carried out to compress the clamp area face of the disc and accordingly the entire molten resin in the cavity by the shoulder portion of the hot plunger.

As a result, it is possible to improve the size stability and the double refractive index of the product. Moreover, this gate sealing operation can act to apply the pressure load to the inside of the cavity and need not be ended during the injection step by moving the hot plunger, so that the pressure control can be made accurate at the injection step.

BRIEF DESCRIPTION OF THE DRAWINGS

FIG. 9 is an operation chart showing the operating states of drive portions in the molding operations according to the present invention;

DESCRIPTION OF THE PREFERRED EMBODIMENT

An embodiment of the present invention will be described with reference to the accompanying drawings.

Figure 1:
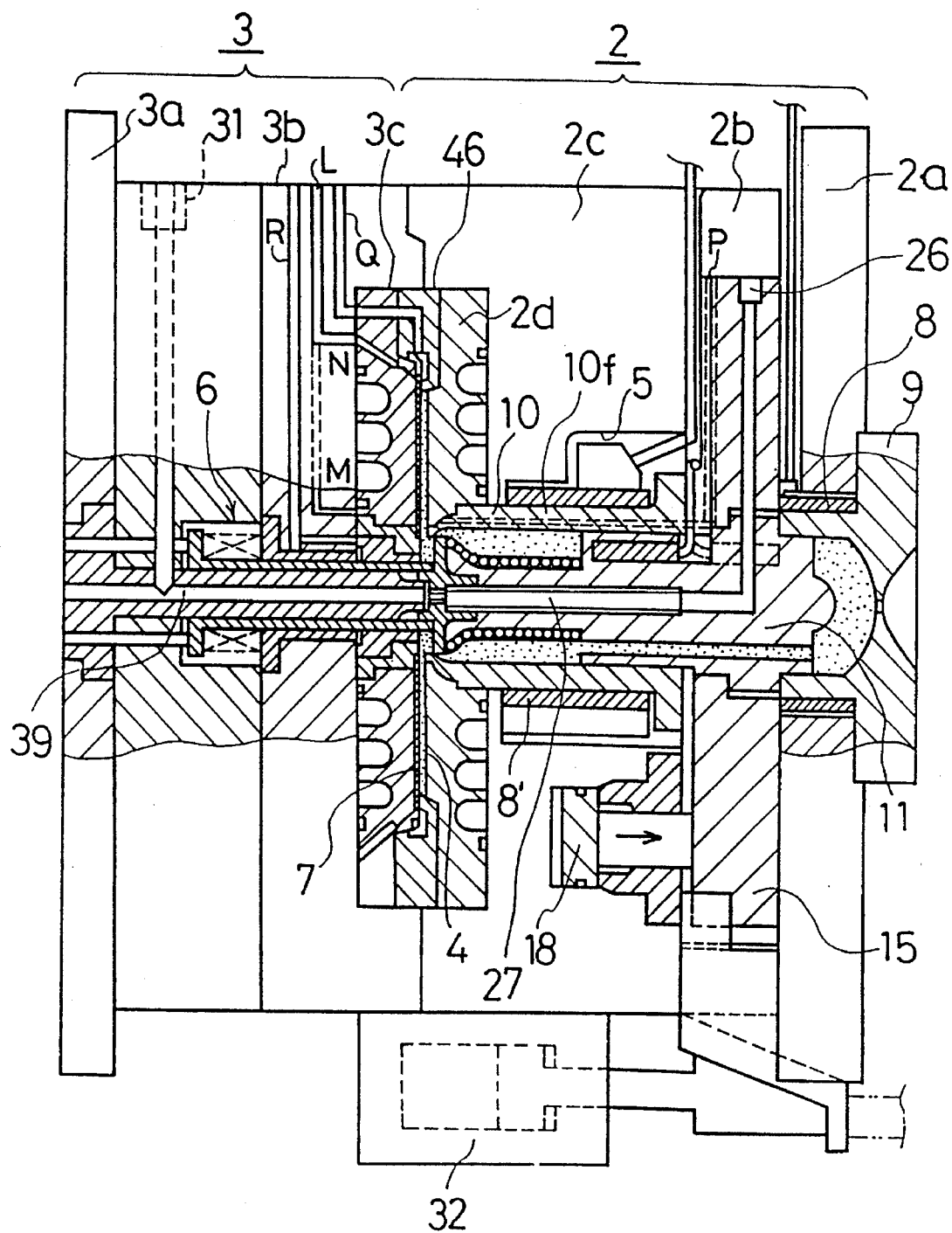
FIG. 1 is a section showing a sprueless disc mold according to the present invention.
Figure 2:
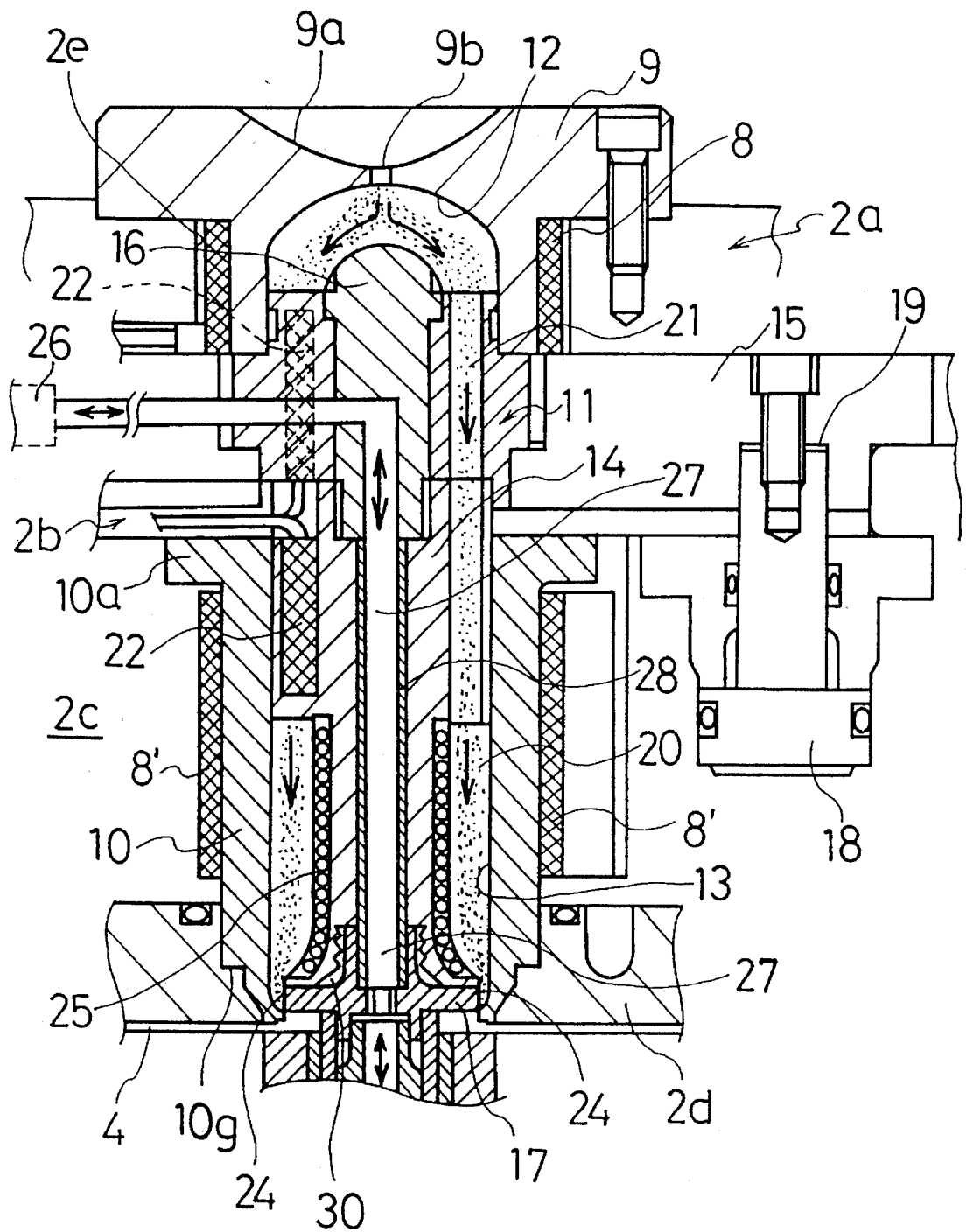
FIG. 2 is an enlarged section showing a portion of the disc mold of FIG. 1.

FIG. 1 is a section showing a structure of a disc molding sprueless mold according to the present invention. FIG. 2 is an enlarged section showing an essential portion or a portion of the mold of the present invention.

The mold is constructed of a stationary molding member 2 and a movable molding member 3, and a cavity 4 for molding a disc is formed between the mating faces of the two members. The mold has a construction for controlling the opening/closing of a gate by a drive source such as a hydraulic cylinder, as will be described later.

The stationary molding member 2 has a stationary mold body constructed by fastening a stationary mounting plate 2a, first and second intermediate plates 2b and 2c and a stationary mirror plate 2d to one another by means of bolts to form an integral structure. This mold body is formed in its central portion with a hollow portion 5 which has a structure transversely extending, as shown, to arrange a hot runner structure therein.

On the other hand, the movable molding member 3 is constructed of: a movable mounting plate 3a to be mounted on the movable table of an injection-molding apparatus; an intermediate plate 3b; and an ejector mechanism 6 for ejecting the molded disc. Moreover, the intermediate plate 3b is constructed to mount a movable mirror plate 3c in its recess and to arrange on the mirror plate a stamper 7 for transferring the recording information data to the disc.

In FIG. 2, the hot runner structure is generally constructed of: an inlet member 9 and a gate insert 10 to be heated by external heaters 8 and 8'; and a hot plunger 11 arranged in and surrounded by these members.

The inlet member 9 is inserted into a center opening 2e of the mounting plate 2a and is formed with: a meniscus surface 9a to abut against the (not-shown) nozzle of the injection apparatus; and an internal hole 12 communicating with its inlet port 9b. On the outer circumference of the inlet member 9, moreover, there is mounted an annular external heater 8 for holding a molten resin in the internal hole 12 in a heated state.

The gate insert 10 is formed into a sleeve shape having a flange 10a and is arranged coaxially with the inlet member 9. The gate insert 10 is inserted into the center opening of the stationary mirror plate 2d and is fixed such that its flange 10a is sandwiched between the intermediate plates 2b and 2c and such that its stepped portion 10g abuts against the shoulder portion of the stationary mirror plate 2d.

On the outer circumference of the gate insert 10 facing the intermediate plate 2c through a gap, moreover, there is mounted the annular external heater 8' for holding the molten resin in its internal hole 13 in the heated state, as in the inlet member 9.

The hot plunger 11 is constructed of a cylindrical body 14, a core plate 15, a joint portion 16 and a plunger cap 17, and the cylindrical body 14 can slide in the gate insert while being guided in the two internal holes 12 and 13 of the inlet member 9 and the gate insert 10. The hot plunger 11 is driven by a plurality of first hydraulic cylinders to move back and forth in the vertical directions of FIG. 2 thereby to open/close a gate 24.

The cylindrical body 14 is divided (vertically of FIG. 2) into two halves to receive the heater 22. Moreover, the cylindrical body 14 is coupled by the joint portion 16 to the core plate 15 which is arranged in the cavity of the intermediate plate 2b, and the hydraulic cylinder 18 fixed in the intermediate plate 2c is mounted on the core plate 15 through an adjust collar 19.

Figure 3:
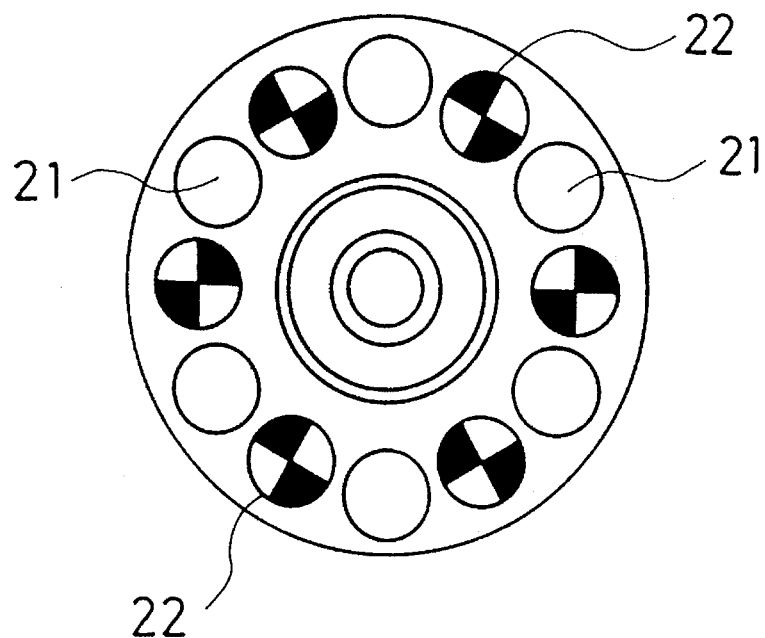
FIG. 3 is a transverse diagram showing the resin passages of a hot plunger in the embodiment of the present invention.

Moreover, the cylindrical body 14 forms an annular chamber (or reservoir) 20 between itself and the gate insert 10 and has totally twelve holes in the outer circumferential edge of the semicircular head of the joint portion 16, as shown in FIG. 3. Here, six resin passages 21 and six internal heaters 22 (of about 500 W) are alternatively arranged radially in parallel.

In the hot plunger 11, as shown in FIG. 2, the plurality of resin passages 21 are made at the leading end of the cylindrical body 14 to communicate with the annular chamber 20 so that their molten resins may merge into one resin reservoir. The annular chamber 20 reserves about one shot of the molten resin to flow from the gate 24 into the cavity 4 thereby to prevent deterioration of the molten resin and the weldline of the molding.

For this, there is arranged around the annular chamber 20 a microheater 25 of about 170 W for holding the melting point of the resin in the chamber. This microheater 25 is either cast in or mounted on the outer circumference of the hot plunger 11 and is then assembled around the reservoir of the molten resin by the (not-shown) cylindrical member. Incidentally, the capacity of the annular chamber 20 may be so decided for the qualities of the moldings that the amount of the molten resin to be reserved may be more than one shot (or amount of injection).

Moreover, the cylindrical body 14 is formed at its central portion with a cooling air passage 27 communicating with a port 26 from the core plate 15 such that the air passage 27 is protected by an insulating pipe 28.

Into the leading end portion of the cylindrical body 14, on the other hand, there is screwed the plunger cap 17 so that the leading end portion may be replaced in case a scoring occurs with the later-described ejector sleeve or air drain bush.

Figure 4:
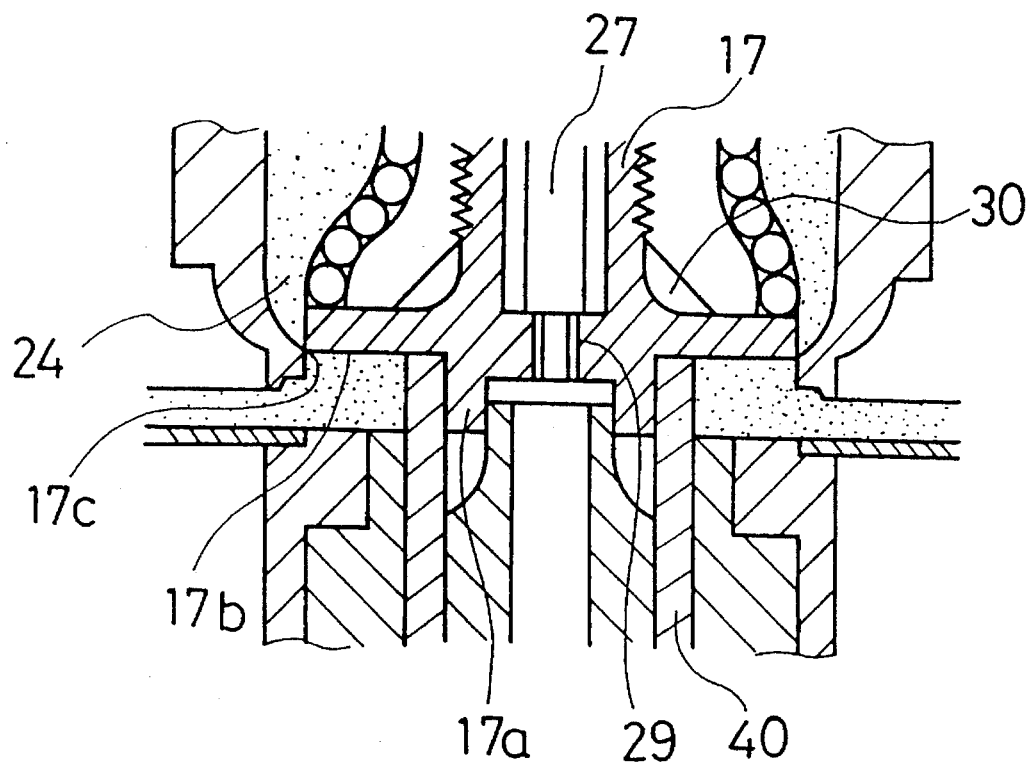
FIG. 4 is an enlarged section showing a cap portion at the leading end portion of the hot plunger in the disc mold of FIG. 1.

As shown in FIG. 4, this cap 17 is equipped at its leading end with an annular ring portion 17a acting as a central engagement portion to be guided by the ejector mechanism 6 and is formed therein with a dispersion air passage 29 composed of a plurality of thin through holes communicating with the air passage 27 of the cylindrical body 14. The air passage 29 is given a far smaller diameter than that of the air passage 27. The air is compressed by the abrupt reduction of the effective area and is then released so that the surrounding temperature quickly drops to maximize the cooling effect.

The leading end portion of the hot plunger 11 including the annular ring portion 17a, a shoulder portion 17b and a chamfered portion 17c can be cooled down by the cooling air passing through the cooling air passage 27, to ensure solidification of the molding and to prevent the molding from any parting deformation at the mold opening time. Moreover, the air passage 29 is formed as a throttle for making the cooling effective. The throttling amount of the cooling air can be changed (in terms of the number of pores) by replacing the plunger cap 17. On the other hand, a space 30 is formed between the plunger cap 17 and the leading end of the cylindrical body 14 of the hot plunger to shield the heat coming from the microheater 25.

The hot plunger 11 thus constructed constitutes the gate 24 at the injection time with both the leading end corner of the plunger cap 17 at its leading end portion and the inner circumference of the gate insert 10.

Figure 5:
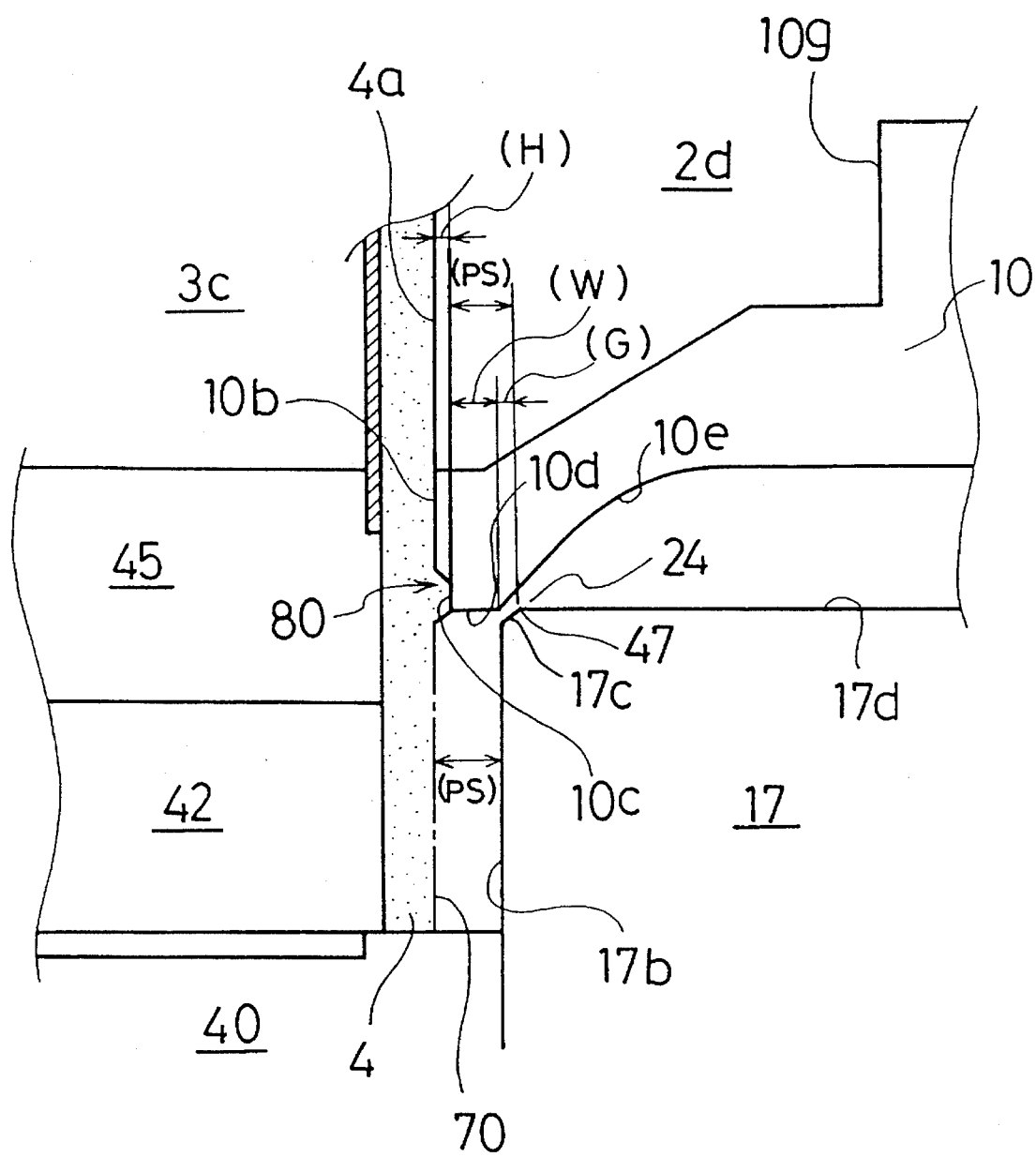
FIG. 5 is an enlarged diagram showing a portion for explaining a gate position in the disc mold of FIG. 1.

FIG. 5 shows a sectional structure of the gate portion according to the feature of the present invention.

The gate 24 is an annular gate because it is formed in the gap between the inner circumference (or opening edge) 10d of the gate insert and the chamfered portion (or corner portion) 17c of the shoulder portion 17b of the hot plunger cap.

The gate insert 10 has its leading end face 10b provided for forming a cavity face, i.e., one clamp area face 70 of the disc together with the shoulder portion 17b of the hot plunger and accordingly made coextensive with the cavity surface 4a of the stationary mirror plate 2d. Moreover, the leading end face 10b is formed in its inner circumferential edge with an annular recess 10c for forming a crest face and outer slopes to form a stack rib 80 of the disc.

On the other hand, the hot plunger cap 17 positioned at the leading end portion of the hot plunger 11 has its leading end corner cut to form the chamfered portion 17c thereby to form the inner slope of the stack rib 80.

Thus, the gate is closed when the hot plunger 11 moves forward so that the outer circumference 17d of the leading end portion leading from the chamfered portion 17c of the cap comes into sliding contact with the inner circumference 10d at the leading end portion of the gate insert 10. In the forward position of the hot plunger, moreover, the annular recess 10c is formed when the end edge of the inner circumference 10d and a bent end 47 of the chamfered portion 17c merge into each other thereby to complete the stack rib forming portion by those contouring faces, so that the gate mark after the molding process completely disappears.

On the other hand, the inner circumference 10d of the gate insert forms a face to come into sliding contact with the cylindrical outer circumference 17d leading to the shoulder portion 17b of the hot plunger cap and is given a width (W) substantially equal to the difference of a hot plunger stroke (PS) from the height (H) of the stack rib. The inner circumference is sized to have a width (W) of about 1 mm and to have such an internal diameter as to come into sliding contact with a flat cylindrical outer circumference 17d forming the gate seal face of the hot plunger cap 17. Hence, the internal diameter is determined by the position of the stack rib.

The hot plunger stroke (PS) is optimized to fall within the following relation, if the gate has a thickness (G) and if the inner circumference 10d has a width (W):

$$PS \leq G + W + 0.1 \text{ (mm)}.$$

On the other hand, the gate thickness (G) or the gap size between the gate insert 10 and the hot plunger cap 17 is a distance from the boundary between the inner circumference 10d and an inner slope 10e to the bent end 47 of the chamfered portion 17c of the hot plunger cap and is optimized by about 0.15 to 0.40 mm as in a CD.

In the present embodiment, the stack rib 80 thus formed is formed into an annular ridge having a trapezoidal section of a height (H) of about 0.15 to 0.40 mm. However, this sectional shape should not be limited to a trapezoid but may be exemplified by a scalene triangle or a curved surface having a flat crest.

Figure 6:
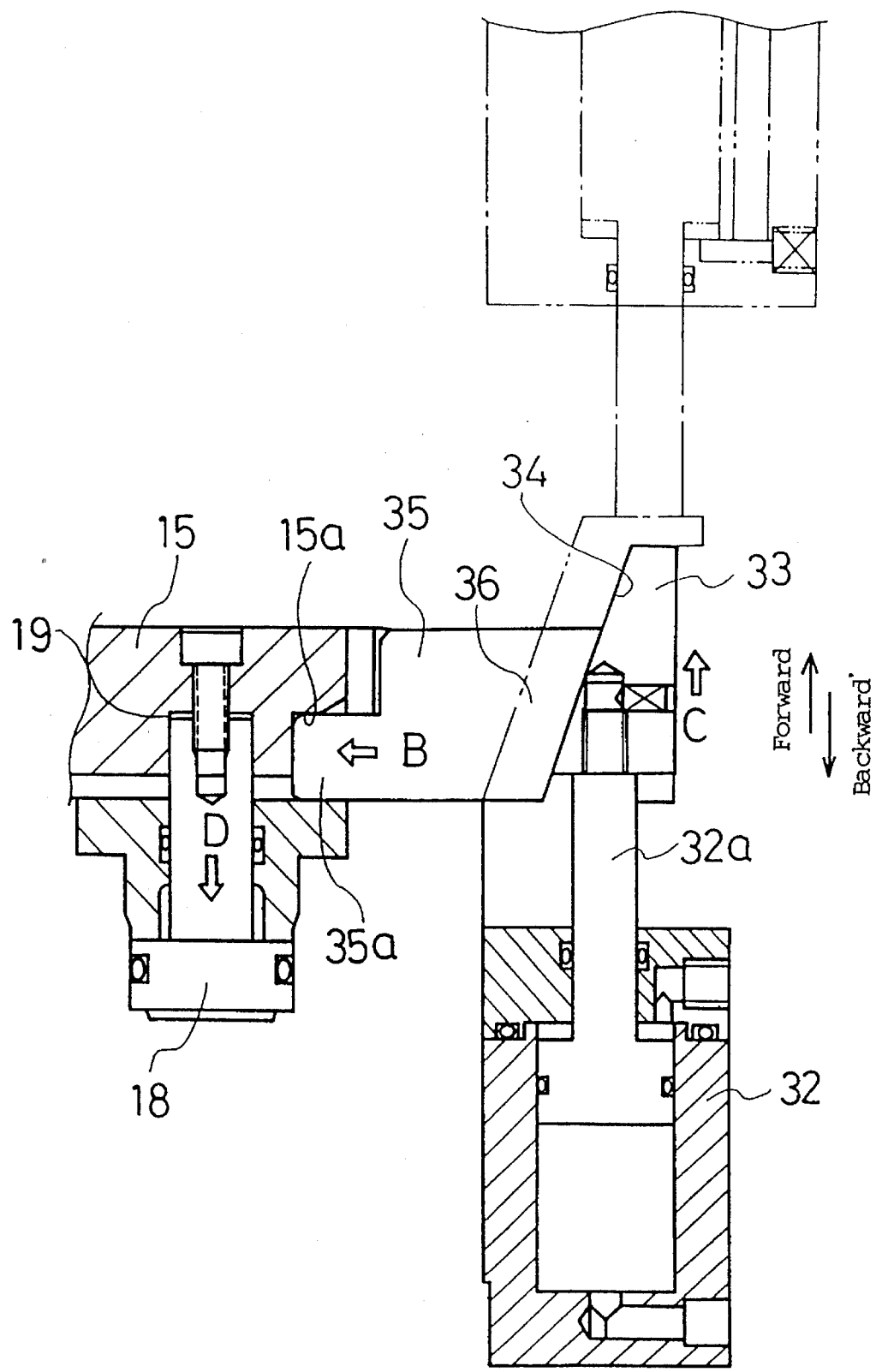
FIG. 6 is a detailed diagram showing a portion or drive means for moving back and forth a hot plunger in the disc mold of FIG. 1.

FIG. 6 shows a construction of the hydraulic cylinder for controlling the opening/closing of the gate by driving the hot plunger according to the present invention. At least one first hydraulic cylinder 18 is arranged symmetrically at each side of the mold and is connected to the core plate 15 so that it may move the hot plunger 11 back and forth by driving the core plate 15 back and forth. As shown in FIG. 1, moreover, the gate is opened by moving the hot plunger 11 back and forth simultaneously with the end of closing the mold.

If, in this case, the mold structure makes it relatively difficult to increase the output of the hydraulic cylinders 18 in relation to the mechanical specifications for mounting the mold, a second hydraulic cylinder 32 is provided for preventing the fluctuation of the hot plunger 11 by the injection pressure.

This hydraulic cylinder 32 has a wedge 33 fixed at its leading end portion and has its taper face 34 formed with a recess to be dovetailed to a stopper plate 35. As a result, when the hydraulic cylinder 32 moves forward, the stopper plate 35 moves in the direction of arrow B to insert its leading end projection 35a into a notch 15a of the core plate thereby to stop the motion of the hot plunger 11. In short, it is possible to prevent the fluctuation of the hot plunger 11 at the injection time.

There are provided at least two second hydraulic cylinders 32 and stopper plates 35 thus far described. Incidentally, the hydraulic cylinders 32 can be not only mounted on the side of the mold but also assembled in the stationary table of the injection-molding apparatus, as indicated by broken lines.

Figure 7:
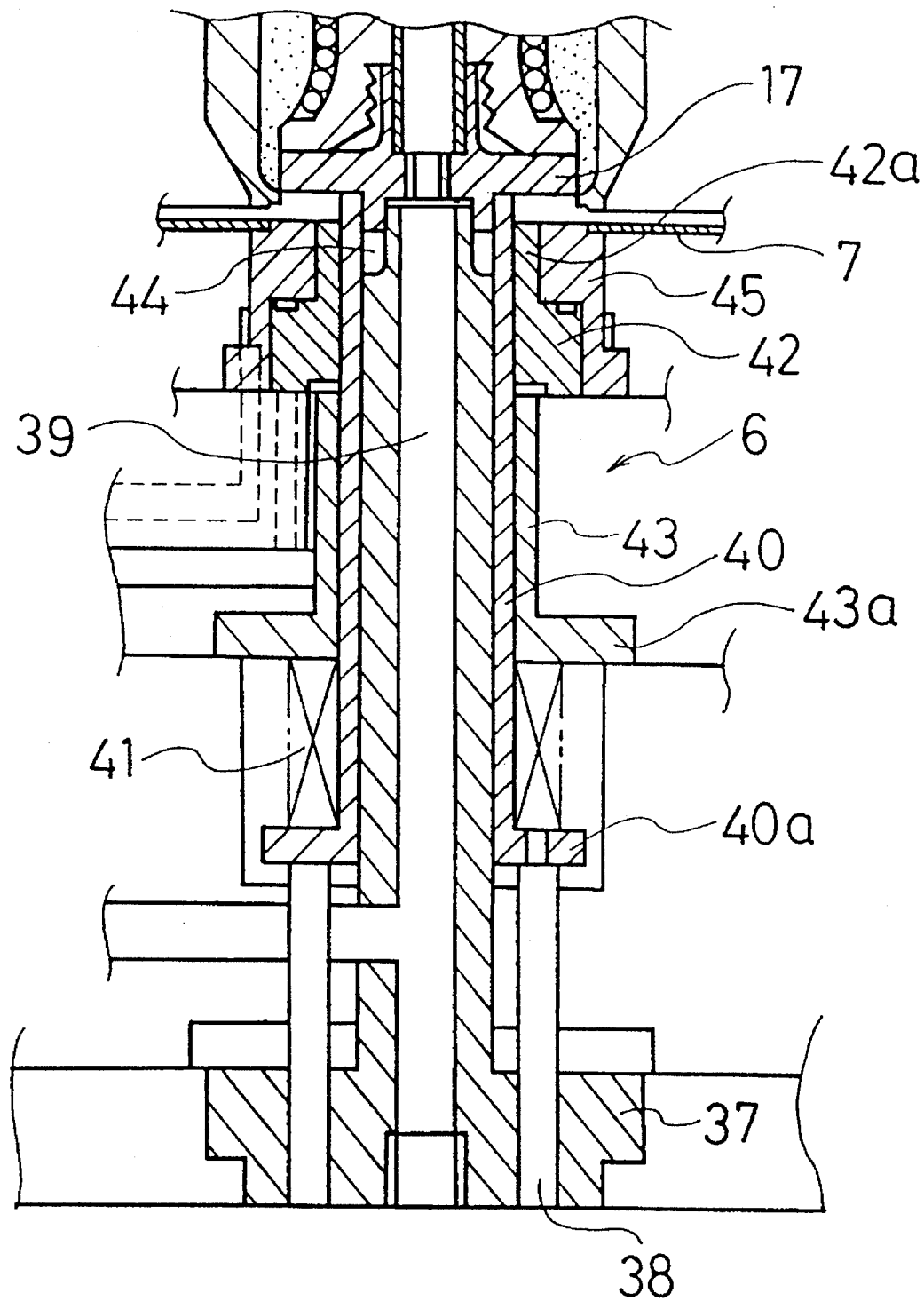
FIG. 7 is an enlarged diagram showing a portion or an ejector mechanism in the disc mold of FIG. 1.
Figure 8:
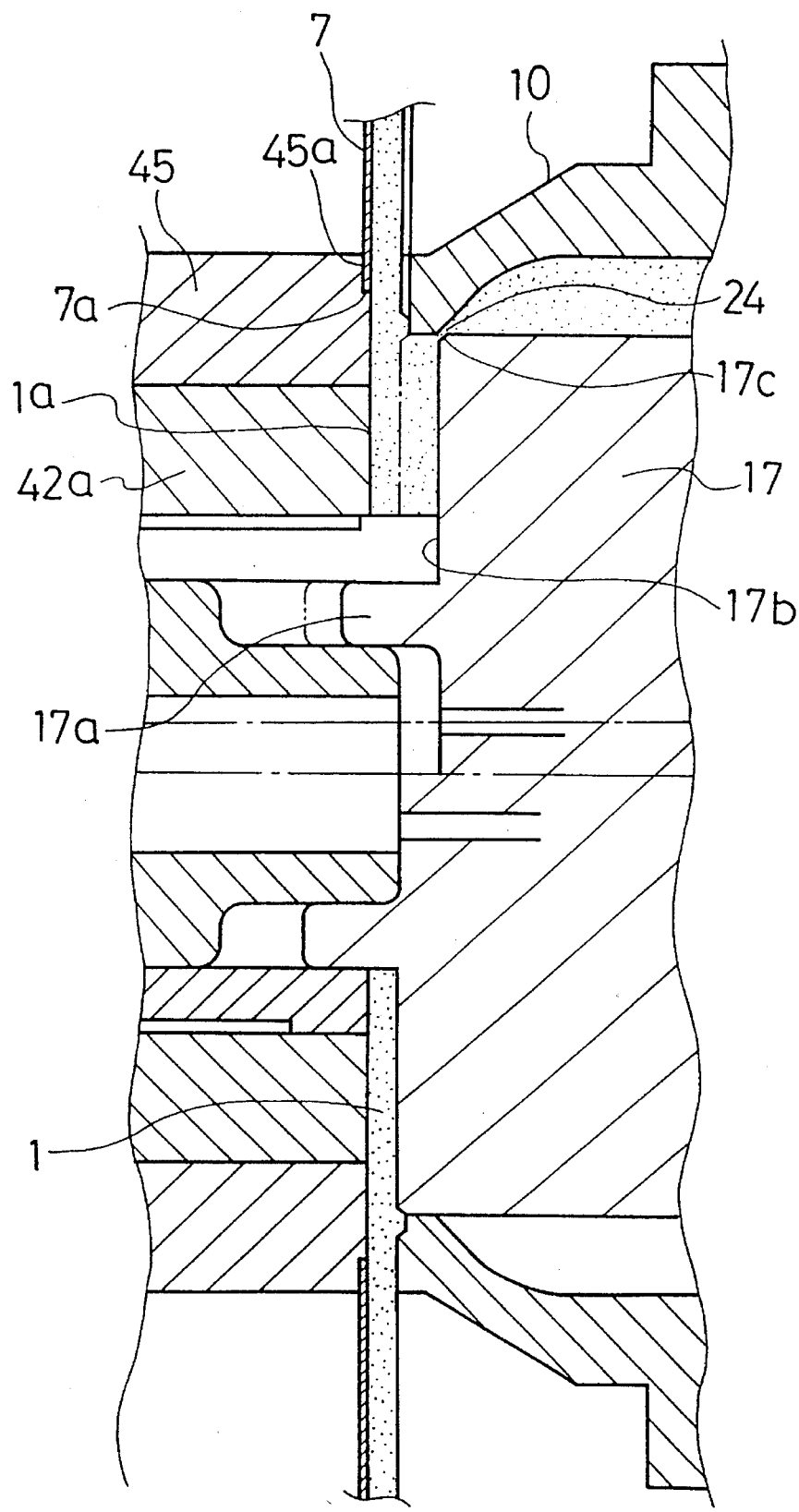
FIG. 8 is a section showing the gate opening/closing positions of the gate in the disc mold of FIG. 1.

FIGS. 7 and 8 present a sectional structure and its partially enlarged section of the ejector mechanism 6 and the hot plunger cap 17 facing the former.

In FIG. 7, the ejector mechanism 6 of the movable molding member 3 is constructed of: an air drain bush 37 buried in the central portion and formed with a center hole for allowing the cooling air to flow therethrough; an ejector sleeve 40 fitted around the air drain bush 37 and protruded through an ejector pin 38 at the mold opening time; a spring element 41, and first and second guide bushes 42 and 43.

The ejector sleeve 40 moves forward at the mold closing end for protruding the disc substrate and backward simultaneously with the forward movement of the hot plunger. As a result of the retraction of the ejector sleeve 40, the molten resin before solidified flows into the occupying area of the ejector sleeve protruded into the cavity-so that the amount of compressing the molten resin in the cavity 4 is accordingly reduced. At the same time, the reaction of the resin pressure to act at the forward moving time of the hot plunger so that the compressing operation of the hot plunger can be stabilized.

The air drain bush 37 is formed therein with a cooling air passage 39 for cooling down the leading end portion of the hot plunger 11, and the annular ring portion 17a protruding to the leading end of the hot plunger cap 17 is fitted in the space between the radially reduced leading end portion of the bush 37 and the ejector sleeve 40, so that the cooling air is prevented from leaking into the cavity by the double-sealing structure at that portion.

The cooling air is supplied simultaneously with the end of the molding closing operation to cool down the leading end portion of the hot plunger. This supply is stopped simultaneously with the start of the mold opening operation.

In FIG. 8, moreover, outside of the first guide bush, there is disposed a stamper holder 45 having a stepped portion 45a, in which is fitted the inner edge 7a of the stamper 7. The outer edge of this stamper 7 is held by an annular stamper holder 46 (as shown in FIG. 1) which is formed on the outer circumferential end portion of the movable mirror plate 3b. Thus, the stamper holder 45 is centered and arranged in a predetermined position on the movable mirror plate 3b of the mold. In the present embodiment, the cooling air is supplied from the port 26 of the stationary molding member 2 and is discharged from a port 31 of the movable molding member 3. However, the cooling air may be supplied from the port 31 and discharged from the port 26.

In the disc mold in the present embodiment of the present invention, as shown in FIG. 1, an air suction passage L for sucking the stamper 7 to the movable molding member 3 is formed to communicate with the annular groove in the movable mirror plate 3c through communication passages M and N which extend in the mating face between the movable mirror plate 3c and the stamper holder 45 and in the positions to face the stamper holder 46. Incidentally, this stamper sucking structure can be replaced by another structure equipped with an inner circumference stamper holder for holding the inner edge of the stamper.

As other sucking passages, moreover, there are formed: a first air suction passage P leading from a through hole 10f formed in the gate insert 10 to the mating faces of the gate insert 10 and the stationary mirror plate 2d; a second air suction passage Q leading to the side portion of the stamper holder 46; and a third air suction passage R leading to the mating faces of the stamper holder 45 an the first guide bush 42.

The first air suction passage P is provided for releasing the disc substrate 1 from the stationary mirror plate 2d at the mold opening time, and the second and third air suction passages Q and R are associated with the operation of the ejector mechanism to suck the air so as to release the disc substrate 1 from the stamper face at the end of the mold opening operation.

Moreover, the mating faces of the stamper holder 46 and the stationary mirror plate 2d are formed with vent holes for releasing the gases in the cavity 4 when the cavity is to be charged with the molten resin by the injection pressure. Still moreover, the external heaters 8 and 8' mounted on the outer circumferences of the injection member 9 and the gate insert 10 and the internal heater 22 disposed in the hot plunger 11 are individually connected with the power supply through electric wires.

In the disc mold of the present embodiment thus far described, the disc cavity 4 is formed in the gap between the stationary mirror plate 2d and the stamper 7 over the movable mirror plate 3c, as in the ordinary mold. The operations of the hot plunger for opening/closing the gate 24 of the cavity will be described in more detail with reference to FIGS. 8 and 9.

FIG. 8 shows the state at the injecting/charging time, in which the gate of the upper half is opened, and the state at the end of the compression operation of the hot plunger in which the gate of the lower half is closed.

On the other hand, FIG. 9 is an operation chart showing the operation states of the drive portion at the individual steps of the molding operations, in which the rightward moving positions of FIG. 1 are indicated at "+" whereas the leftward moving positions are indicated at "−".

At the closing time of the mold, the hot plunger 11 is in its protruded position (as indicated at C in FIG. 10) so that both the first and second hydraulic cylinders 18 and 32 are in their retracted positions (as indicated in the leftward position "−" of FIG. 9) to close the gate 24.

While the mold clamping pressure is being increased or when the same is ended, the first hydraulic cylinder is protruded (to the rightward position "+" of FIG. 9) to retract the hot plunger 11.

In this protruded position of the first hydraulic cylinders 18, as shown in FIG. 6, the second hydraulic cylinders 32 are driven to move the wedge 33 together with a piston 32a forward (in the direction of arrow C) so that the stopper plate 35 is pushed in the direction B by the wedge 33. As a result, the projection 35a of the stopper plate comes into the notch 15a of the core plate 15, to fix the piston position of the first hydraulic cylinders 18. Thus, the leading end position of the hot plunger can be prevented from fluctuating by the resin pressure higher than a predetermined level.

In this position, moreover, the injecting/charging operations are carried out by injecting the resin mold into the cavity 4. In these two operations, both the hydraulic cylinders are in the rightward position "+".

These operations are followed by the compressing operation of the hot plunger to protrude the hot plunger. As a result, the second hydraulic cylinders 32 are driven to retract the wedge 33 (in the direction opposite to the arrow C of FIG. 6) together with the piston 32a thereby to release the projection of the stopper plate 35 from the core plate 15 so that the pistons of the first hydraulic cylinders 18 can be retracted (in the direction of arrow D). Thus, both the hydraulic cylinders take the leftward positions "−", in which the first hydraulic cylinders 18 are retracted in the D direction. As a result, the hot plunger 11 moves forward toward the stamper 7. Simultaneously with this, the pressure of the hydraulic ejector cylinder of the (not-shown) injection-molding apparatus is released to allow the ejector sleeve 40 to be returned by the spring 41.

As a result, the chamfered portion 17c and the recess 10c of the gate insert are positioned to form the recess of the stack rib molding space, and the shoulder portion 17b of the cap reaches to the cavity position matching the thickness of the disc. As shown at the lower half of FIG. 8, moreover, as the ejector sleeve 40 is retracted, the molten resin flows around the annular ring portion 17a of the hot plunger cap 17 so that the center opening is formed by not the punching operation but the molding operation.

Next, after the cooling operation, the mold is opened by the mold operation operation. Then, the disc is pushed out by the forward and backward movements of the ejector pin so that the molded disc is extracted.

A series of these operation cycles are continued to mold the discs continuously.

From these operations, the hot plunger 11 or the hot plunger cap 17 can move at a stroke from the position, in which the chamfered portion 17c defines a predetermined gate opening between itself and the inner circumference 10d of the gate insert, to the cavity position in which it forms the stack rib 80 together with the recess 10c of the gate insert and in which the shoulder portion 17b matches the thickness of the disc. In the present embodiment, the hot plunger 11 has its stroke PS set to about 1 to 2.0 mm.

Incidentally, the symbol "−/+" appearing in the operation chart of FIG. 9 indicates that, in the operation of the ejector pin, the ejector pin is protruded in the course of the molding closing operation to fit the ejector sleeve in the annular ring of the hot plunger cap 17. As a result, the ejector sleeve guides the forward movement of the hot plunger and holds the protruded position till the injection holding after the injecting/charging operations, to raise an effect to reduce the amount of the molten resin to be compressed by the hot plunger.

Another symbol "−/+" is used for promoting the molding cycle by operating a cooling air blow delaying timer from the start of the injecting/charging operations so that during the charging operation of the time-up, the cooling air may be fed through the cooling air passage 27 to the cooling air passage 29 of the cap 17 and discharged from the air drain bush 37 to cool down the molten resin in the cavity at an early stage.

This cooling air is fed to the cooling step of the molding cycle, too.

Figure 10:
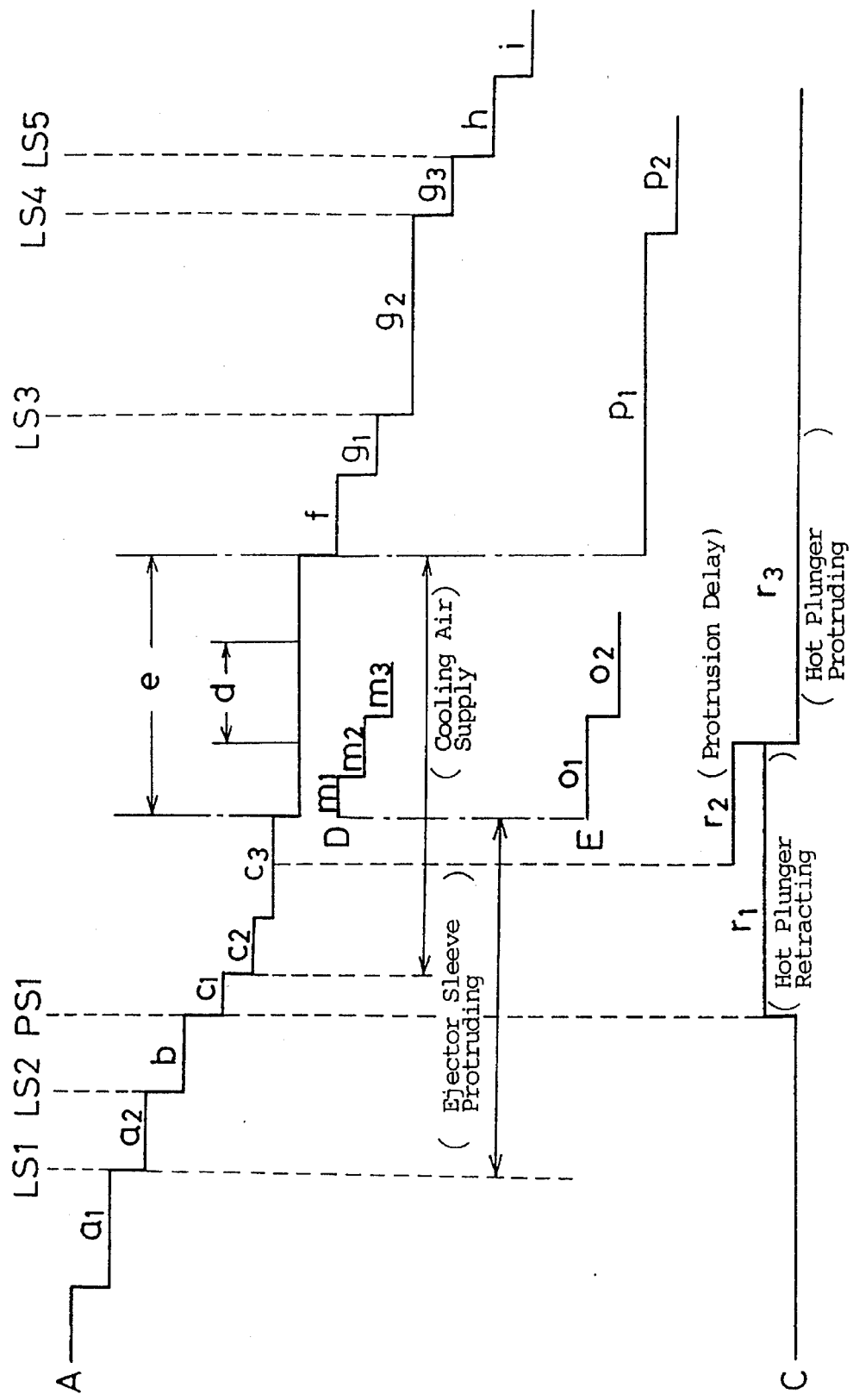
FIG. 10 is a time chart showing a series of operations in the injection cycle according to the present invention.
Figure 11:
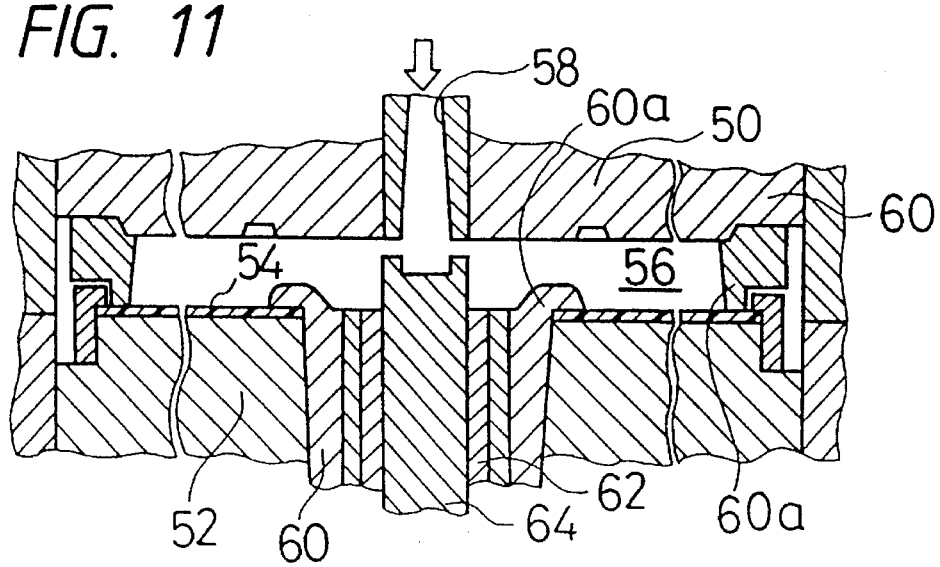
FIG. 11 is a section showing a cavity portion of a disc mold used in general.
Figure 12:
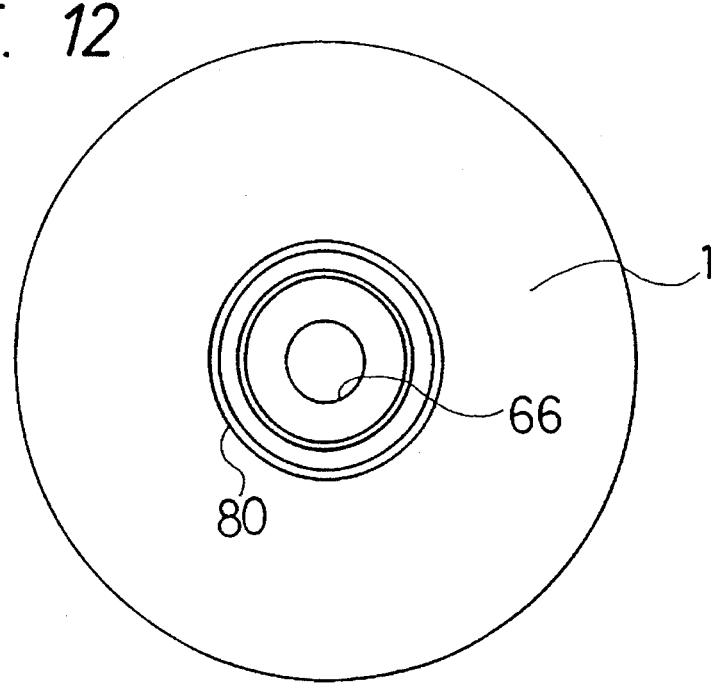
FIG. 12 is a top plan view showing a disc substrate.
Figure 13:
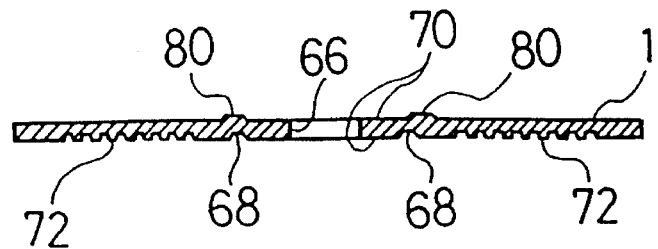
FIG. 13 is a side section of the disc substrate of FIG. 12.
Figure 14:
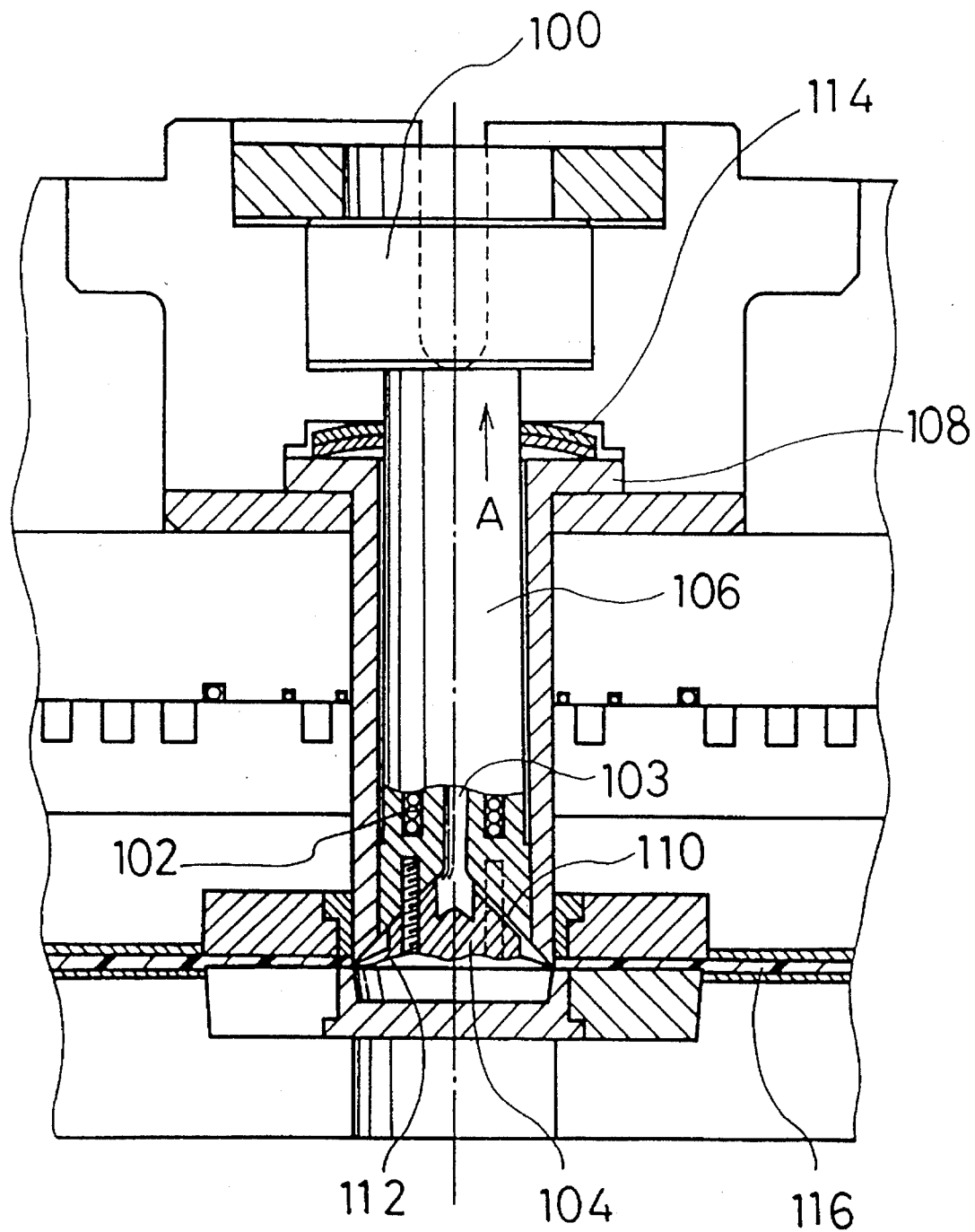
FIG. 14 is a section showing an essential portion of an example of the structure of the sprueless disk mold of the prior art.
Figure 15:
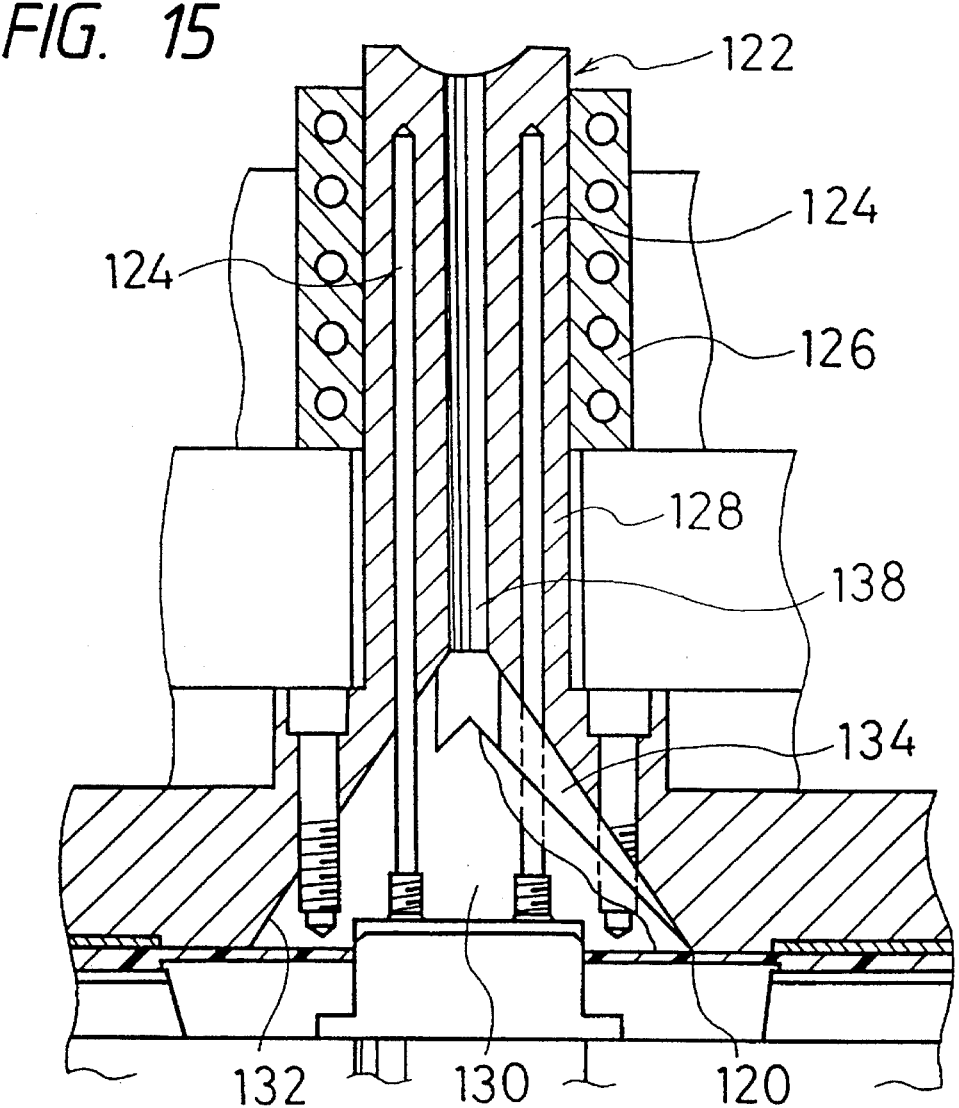
FIG. 15 is a section showing an essential portion of a structure of the sprueless disc mold according to another example of the prior art.
Figure 16:
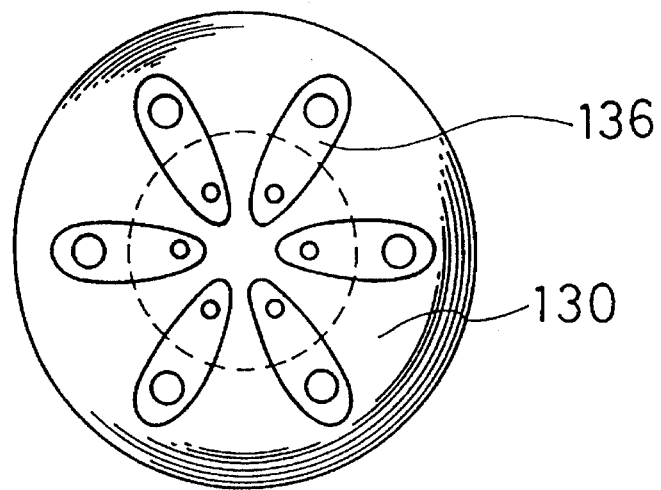
FIG. 16 is a transverse section showing resin passages of the mold of FIG. 15.

On the basis of the time chart illustrating the timings at the injection-molding step of FIG. 10, the method of manufacturing the discs by using the disc molding sprueless mold of the present embodiment will be described in the following together with a detailed example of the operations.

A disc is molded by using the sprueless disc mold of the present invention, as follows:

first of all, the mold is closed while the ejector sleeve 40 being held in its protruded state, and after this mold closing operation, the hot plunger 11 is retracted by the drive means (i.e., the first hydraulic cylinders 18) to open the gate 24 while holding the abutting state with the leading end of the ejector sleeve 40, so that the cavity is charged with the molten resin under a predetermined injection pressure;

next, after these injecting/charging operations, a proper holding pressure is applied to protrude the hot plunger 11 before the molten resin is solidified, and the outer circumference 17d of the leading end portion of the hot plunger is brought into sliding contact with the inner circumference 10d of the gate insert to close the gate 24;

moreover, the shoulder portion 17b positioned at the leading end portion of the hot plunger 11 pushes the cavity face to protrude the hot plunger 11 while compressing the molten resin until it is moved to the position for forming the clamp area face 70 matching a predetermined thickness of the disc; and at the end of the compressing operation of the hot plunger 11, the annular recess 10c for forming the crest of the stack rib 80 rising from one face of the disc merges into the chamfered portion 17c, which is formed on the corner of the shoulder portion 17b to form the inner slope leading from the crest of the stack rib 80 to the disc face, to form the annular recess for forming the stack rib 80 on the cavity face, and the ejector sleeve 40 is retracted while the hot plunger 11 is being protruded, to mold the center opening by the outer circumference of the leading end portion of the hot plunger.

The molding operation by the above-specified step will be described with reference to FIG. 10.

First of all, the injection is carried out under predetermined injection conditions by loading the injection-molding apparatus with the mold according to the present invention. FIG. 10 illustrates the time chart for a series of operations of one injection cycle from the mold closing operation to the mold opening operation. A broken line A indicates the operation procedure of the injection-molding apparatus, as includes: a mold closing step (having a fast mold closing step $a_1$ and a slow mold closing step $a_2$); a boosting step b; an injection step (having an injection delaying step $c_1$, an injecting/charging step $c_2$ and an injection holding step $c_3$);

a hot plunger compressing step d; a cooling step e; a pressure releasing step f; a mold opening step (having a slow mold opening step $g_1$, a fast mold opening step $g_2$ and a slow mold opening step $g_3$); an ejector protruding step h; and an ejector retracting step i.

From the mold opening state, the mold clamping operation is started. First of all, a series of the molding closing step a is performed, in which the mold clamping cylinder of the injection-molding apparatus is driven to move the movable molding member at the fast mold closing step $a_1$, and in which a limit switch LS1 is actuated to effect the slow mold closing step $a_2$ when the movable molding member comes close to the stationary molding member, until the mold closing operation is ended at the time when the molding members come into contact with each other. Then, a limit switch LS2 is actuated to execute the boosting step b so as to raise the pressure in the mold clamping cylinder to a predetermined level. Then, a boosting ending pressure switch PS1 is actuated to operate the injection delaying timer (at the step $c_1$).

At the end of the injection delaying timer, the molten resin in the heating cylinder is injected (at the step $c_2$) into the cavity. At this time, the supply of the cooling air through the cooling holes 29 of the hot plunger cap 17 is started. Incidentally, this cooling air supply is completed till the end of the molding cooling step.

After the end of the injection, moreover, the injection holding is switched to apply a proper holding pressure (i.e., the secondary injection pressure) to the molten resin in the cavity. At this instant, in the operation of the hot plunger 11, as indicated by broken lines C, a timing protrusion delaying timer is operated for protruding the hot plunger to execute a hot plunger protrusion delay $r_2$. Since, at this time, the hot plunger 11 has to be protruded before the molten resin is solidified, the protrusion delay $r_2$ may be set to zero. This timing is determined by the operator by observing the quality of the product which is actually molded.

At the mold clamping device, on the other hand, the mold is cooled at the step e at the end of the injection step. At the injection side, a resin supply start delaying step $m_1$, a charge step $m_2$ and a suck-pack step $m_3$ are sequentially performed at the charging operation step, as indicated by broken lines D.

At an air blowing step E in the stationary molding member, a delay timer for timing the air blow at the stationary side is operated (at a step o1), and a stationary side air blowing step o2 is started after the time-up. This prevents the solidified disc from being caught by the stationary mirror plate 2d and left at the stationary molding member at the mold opening time.

After the end of this cooling step e, a time period (of 0.2 secs) for the pressure releasing step f is prepared, and the mold opening operation is started to effect the slow mold opening step $g_1$. Limit switches LS3 and LS4 are sequentially actuated to effect the fast mold opening step $g_2$ and the slow mold opening step $g_3$. This mold opening operation is ended by actuating a limit switch LS5 and is followed by the ejector protruding step h.

At this time, the movable side air blow delaying timer is already timed up so that the movable side air is blown (at steps $p_1$ and $P_2$) simultaneously with the slow molding opening step $g_3$. As a result, the disc fixed on the stamper can be released from the movable side molding member by protruding the ejector sleeve of the mold and by the air from the communication holes.

In the operations of the hot plunger, as indicated by the broken lines C, the solenoid valve is actuated by the pressure switch PS1 to be operated after the end of the mold boosting step, so that the hot plunger is forcibly retracted (at a step $r_1$) because it is connected to the hydraulic cylinder 18 through the core plate 15. As a result, at the injection time, the open edge of the gate insert and the chamfered portion 17c of the hot plunger are spaced from each other to form the gate port of the molten resin. At the switching time to the secondary injection at which the holding pressure of the injection is applied, moreover, the protrusion delaying time of the hot plunger is operated (or set to zero), and the hot plunger is protruded at a proper timing to have its cylindrical outer circumference 17d fitted on the opening edge 10d of the gate insert thereby to seal the gate 24.

At the forward limit position of the hot plunger 11, moreover, the clamp area face 70 matching the stack rib 80 and the disc thickness is then simultaneously formed. Moreover, the disc has its center opening defined by the external size of the annular ring portion 17a of the hot plunger 11 so that it can be highly accurately formed.

Although the present invention has been described in connection with its embodiment, its components can be modified within the scope of the appended claims. For example, the present invention can be constructed such that the leading end portion of the hot plunger cap is formed into an annular ring shape and is fitted in the space between the ejector sleeve and the air drain bush. This construction may be reversed in the fitting joint between those recessed and bulging portions.

In the present embodiment, moreover, the ejector sleeve is given the functions of the double sealing part of the cooling air and the guide part for moving the hot plunger forward and is held in the position till the injection holding after the injecting/charging operations thereby to reduce the amount of the molten resin to be compressed by the hot plunger, but the ejector sleeve may be given a single function to protrude. The leading end portion of the hot plunger to be fitted in the ejector sleeve may be given a diameter for forming the center opening of the disc.

As is now apparent from the description thus far made, the disc mold of the present invention is formed with the annular recess for shaping the stack rib of a disc by bring the annular recess, which is formed in the inner circumferential edge of the leading end of the gate insert, and the chamfered portion, which is formed on the corner of the leading end portion of the hot plunger, into contact with each other in the protruded position of the hot plunger after the gate sealing. As a result, the gap is substantially zero in those contacting portions so that the gate is substantially made to disappear thereby to leave no gate mark in the disc.

Since, moreover, the center opening of the disc is formed by the central engagement portion at the leading end of the hot plunger but need not be punched, the molding cycle can be improved without any catch of chip or the like to enhance the production yield.

Since, furthermore, the gate is positioned to face the corner of the stack rib, the hot plunger can have its diameter enlarged to stabilize the molten state of the resin and to ensure the compressing actions of the hot plunger, the molten resin in the cavity can be homogeneously compressed to improve the size stability and the double refractive index of the product.

According to the present invention, furthermore, the cooling air passage is formed in the leading end portion of the hot plunger so that the molten resin in the cavity can be cooled down separately of the mold cooling step. As a result the cooling time period, which takes the longest period in the molding cycle, can be shortened to lower the molding cost of the product.

What is claimed is:

1. A disc molding method using a sprueless disc mold including: a stationary molding member and a movable molding member; mirror plates arranged to face each other between said stationary molding member and said movable molding member thereby to form a cavity for molding a disc; a stamper arranged on at least one of said mirror plates for transferring recording information to said disc; a gate insert arranged in a hollow portion between a gate leading to said cavity and an inlet port of a molten resin; a hot plunger adapted to come into sliding contact with said gate insert and heated and held; drive means for moving back and forth said hot plunger to open/close said gate; an ejector mechanism for protruding the molded disc, and a cooling air passage for cooling down the leading end of said hot plunger, wherein said hot plunger includes a shoulder portion formed at its leading end portion, wherein said gate insert includes: leading end face forming a portion of a cavity face together with the shoulder portion of the hot plunger; an annular recess for forming said disc into a shape having one face raised to the crest of a stack rib; and an inner circumference extending from the inner circumferential edge of said circumferential recess toward said gate, wherein said hot plunger further includes at its leading end portion: an outer circumference forming the inner circumference near said gate and adapted to come into sliding contact with the inner circumference of said gate insert to close said gate; a chamfered portion formed on the corner, at which said outer circumference and said shoulder portion come into contact with each other, and having an inner slope leading from the crest of said stack rib to the face of said disc, comprising the steps of:

retracting, after the operation of closing said mold, said hot plunger from a first hydraulic cylinder to open said gate thereby to inject and charge said cavity with the molten resin, and then applying a proper holding pressure;

protruding said hot plunger, before the molten resin solidifies, to bring the outer circumference of its leading end portion into sliding contact with the inner circumference of said gate insert to close said gate;

further protruding said hot plunger while compressing the molten resin with the shoulder portion of the leading end portion of said hot plunger pushing the cavity face, to bring said shoulder portion to a position in which a clamp area face matching a predetermined thickness of the disc is formed; and forming, at the end of the compressing operation of said hot plunger, the center opening of the disc around the central engagement portion at the leading end portion of said hot plunger and bringing the annular recess formed in the inner circumferential edge of said gate insert and the chamfered portion formed on the corner of the shoulder portion at the leading end portion of said hot plunger, into contact with each other to form the cavity face with an annular recess for forming a stack rib.

2. A disc molding method according to claim 1, further comprising the step of actuating a second hydraulic cylinder, when said hot plunger is retracted by said first hydraulic cylinder, insert a stopper plate into one side portion of a core plate connecting said hot plunger and said first hydraulic cylinder to fix the motion of said first hydraulic cylinder thereby to fix the position of said hot plunger which might otherwise be fluctuated by the injection pressure.

3. A disc molding method according to claim 1, further comprising the step of protruding an ejector sleeve of said ejector mechanism into fitted engagement with the central engagement portion at the leading end portion of said hot plunger, at the time of closing the mold, and into abutment against said shoulder portion so that said ejector sleeve may be retracted at the time of compressing the molten resin according to the forward movement of said hot plunger.

4. A disc molding method according to claim 1, further comprising the step of feeding cooling air through thin dispersion air passages at the leading end portion of said hot plunger at a predetermined time interval from the start of the injecting/charging operations.

5. A sprueless disc mold comprising:

a stationary molding member and a movable molding member;

mirror plates arranged to face each other between said stationary molding member and said movable molding member thereby to form a cavity for molding a disc;

a stamper arranged on at least one of said mirror plates for transferring recording information to said disc;

a gate insert arranged in a hollow portion between a gate leading to said cavity and an inlet port of a molten resin;

a hot plunger adapted to come into sliding contact with said gate insert and heated and held;

drive means for moving back and forth said hot plunger to open/close said gate;

an ejector mechanism for protruding the molded disc; and a cooling air passage for cooling down the leading end of said hot plunger, wherein said hot plunger includes a shoulder portion formed at its leading end portion, wherein said gate insert includes: a leading end face forming a portion of a cavity face together with the shoulder portion of said hot plunger; an annular recess for forming said disc into a shape having one face raised to the crest of a stack rib; and an inner circumference extending from the inner circumferential edge of said circumferential recess toward said gate, wherein said hot plunger further includes at its leading end portion: an outer circumference forming the inner circumference near said gate and adapted to come into sliding contact with the inner circumference of said gate insert to close said gate; a chamfered portion formed on the corner, at which said outer circumference and said shoulder portion come into contact with each other, and having an inner slope leading from the crest of said stack rib to the face of said disc, and wherein at the protruded position of said hot plunger the annular recess of said gate insert and the chamfered portion of said hot plunger are made to come into contact with each other to form a recess for forming said stack rib.

6. A sprueless disc mold according to claim 5, wherein said ejector mechanism includes an ejector sleeve adapted to be fitted in the outer circumference of the central engagement portion of said hot plunger and to come into abutment against said shoulder portion when said mold is to be closed.

7. A sprueless disc mold according to claim 5, wherein said drive means includes: a first hydraulic cylinder fixed in said stationary molding member for moving back and forth a core plate coupled to said hot plunger; and a second hydraulic cylinder for driving a stopper plate into and out of one side portion of said core plate.

8. A sprueless disc mold according to claim 7, wherein said second hydraulic cylinder mounted on the side portion of said stationary molding member or on the stationary table side of a molding apparatus and including a piston having a wedge fixed at its leading end so that it may be dovetailed with said stopper, whereby the forward force of said piston is converted into a transverse force to bring said stopper plate into engagement with one side portion of said core plate.

9. A sprueless disc mold according to claim 5, wherein said air passage includes a plurality of thin dispersion air passages having an aperture ratio of ⅕ to ¹⁄₂₀ to the aperture ratio of the cooling air passage extending through the central portion of said plunger.

10. A sprueless disc mold according to claim 5, wherein said hot plunger is arranged axially therethrough with said cooling air passage to be guided into the center hole of said movable molding member and includes: a plurality of resin passages arranged around said cooling air passage and extending in parallel with the axial direction to communicate with a reservoir leading to said gate; a plurality of internal heaters arranged around said cooling air passage and alternately in parallel with said resin passages; and an annular microheater mounted around the circumference of said reservoir at the side of said hot plunger.

11. A sprueless disc mold according to claim 5, wherein said hot plunger has its leading end portion constructed of a removable cap, and wherein said cap includes a plurality of dispersion air passages communicating with said cooling air passage and having a smaller diameter than that of the latter.

12. A sprueless disc mold according to claim 11, wherein the central engagement portion at the leading end of said cap has an annular ring portion projected from said shoulder portion, and wherein said annular ring portion forms a dual sealing structure to be fitted in the gap formed between an ejector sleeve and the leading end portion of an air drain bush to construct a cooling air passage communicating with said dispersion air passages and the center hole of said air drain bush.

* * * * *